（12） United States Patent
Yamaguchi et al.

(10) Patent No.: US 8,281,714 B2
(45) Date of Patent: Oct. 9, 2012

(54) FUME DISPOSAL PROCESS AND FUME DISPOSAL SYSTEM

(75) Inventors: Yoshihiro Yamaguchi, Kaga (JP); Satoshi Ohnishi, Komatsu (JP); Takahiro Hata, Komatsu (JP); Yukihiro Ishikuri, Ota (JP)

(73) Assignees: Komatsu Industries Corporation, Komatsu-Shi (JP); Shinkogiken Co., Ltd., Ohta-Shi (JP)

( * ) Notice: Subject to any disclaimer, the term of this patent is extended or adjusted under 35 U.S.C. 154(b) by 0 days.

(21) Appl. No.: 12/083,176

(22) PCT Filed: Aug. 28, 2006

(86) PCT No.: PCT/JP2006/316835
§ 371 (c)(1),
(2), (4) Date: Apr. 7, 2008

(87) PCT Pub. No.: WO2007/049393
PCT Pub. Date: May 3, 2007

(65) Prior Publication Data
US 2009/0126533 A1    May 21, 2009

(30) Foreign Application Priority Data
Oct. 28, 2005 (JP) .................................. 2005-313871

(51) Int. Cl.
*B22F 3/02* (2006.01)
*B22F 3/03* (2006.01)
*B30B 11/00* (2006.01)
*B30B 11/02* (2006.01)
*B30B 15/30* (2006.01)

(52) U.S. Cl. .......... 100/215; 100/214; 100/218; 425/78; 425/450.1; 425/472

(58) Field of Classification Search .................. 75/770; 425/78
See application file for complete search history.

(56) References Cited

U.S. PATENT DOCUMENTS 1,741,544 A * 12/1929 Slagle et al. ..................... 75/770
2,110,972 A *  3/1938 Dinzl ............................... 425/78
(Continued)

FOREIGN PATENT DOCUMENTS
JP          04-123897 A     4/1992
(Continued)

OTHER PUBLICATIONS

Japanese Office Action dated Jun. 24, 2008, issued in a counterpart Japanese Application.

(Continued)

*Primary Examiner* — Roy King
*Assistant Examiner* — Jared Wood
(74) *Attorney, Agent, or Firm* — Holtz, Holtz, Goodman & Chick, PC

(57) ABSTRACT

For collecting fine particles from fume generated in the process of thermal cutting or welding of a metal material and solidifying them, a fume disposal system comprises a fume introducing chamber 25 which is connected to a cutting machine body through a suction duct 2 and into which suctioned fume is introduced; a bug filter 24 for separating and collecting fine particles from the fume introduced into the fume introducing chamber 25; a hopper 22 for storing the separated, collected fine particles; a screw conveyor for conveying the fine particles stored in the hopper 22 to a molding chamber; and a pressurizing device 38 for pressurizing the fine particles fed into the molding chamber to reduce the volume thereof.

3 Claims, 9 Drawing Sheets

U.S. PATENT DOCUMENTS

| | | | | |
|---|---|---|---|---|
| 2,252,697 | A | * | 8/1941 | Brassert .......................... 419/30 |
| 3,938,920 | A | * | 2/1976 | Fleissner ......................... 425/78 |
| 4,428,906 | A | * | 1/1984 | Rozmus ........................... 419/48 |
| 5,812,924 | A | * | 9/1998 | Shaffer et al. .................... 419/2 |

FOREIGN PATENT DOCUMENTS

| | | | | |
|---|---|---|---|---|
| JP | 05-043031 | A | | 2/1993 |
| JP | 05-057360 | A | | 3/1993 |
| JP | 05-230727 | | * | 9/1993 |
| JP | 05-230727 | A | | 9/1993 |
| JP | 06-292970 | A | | 10/1994 |
| JP | 07-232276 | A | | 9/1995 |
| JP | 07232276 | A | * | 9/1995 |
| JP | 07-308799 | A | | 11/1995 |
| JP | 08-57693 | A | | 3/1996 |
| JP | 09-267013 | A | | 10/1997 |
| JP | 2000-135596 | A | | 5/2000 |
| JP | 2001-138058 | A | | 5/2001 |
| JP | 2002-239328 | A | | 8/2002 |
| JP | 2002239328 | A | * | 8/2002 |
| JP | 2005-152834 | A | | 6/2005 |
| JP | 3115833 | U | * | 10/2005 |
| KR | 10-0459645 | B1 | | 12/2004 |

OTHER PUBLICATIONS

English translation of Japanese Office Action dated Jun. 24, 2008, issued in a counterpart Japanese Application.
International Preliminary Report on Patentability, Chapter I of the Patent Cooperation Treaty, and Written Opinion for PCT/JP2006/316835, dated Sep. 18, 2008. 5 sheets.
Japanese Office Action (and English translation thereof) dated Dec. 2, 2008, issued in a counterpart Japanese Application.
Korean Office Action dated Mar. 9, 2010 and English translation thereof issued in counterpart Korean Application No. 2008-7008659.
Korean Office Action dated Aug. 1, 2011 (and English translation thereof) in counterpart Korean Application No. 10-2010-7009908.
Partial English translation of JP 07-232276, provided by third party, Townsend & Banta, of Washington D.C.
Full English translation of JP 07-232276, prepared on behalf of Applicants.
Partial English translation of JP 08-57693, provided by third party, Townsend & Banta, of Washington D.C.
Full English translation of JP 08-57693, prepared on behalf of Applicants.
Letter dated May 10, 2010 sent by third party, Townsend & Banta, of Washington D.C.

* cited by examiner

FIG. 1 OVERALL PERSPECTIVE VIEW OF A PLASMA CUTTING MACHINE ACCORDING TO AN EMBODIMENT OF THE INVENTION

1: CUTTING MACHINE BODY
2: SUCTION DUCT
3: DUST COLLECTOR
4: WORKPIECE
5: TABLE
13: EXHAUST CHAMBER
14: EXHAUST PORTS
16: PREFILTER

PARTIAL FRONT VIEW OF A DUST COLLECTOR

PARTIAL SIDE VIEW OF THE DUST COLLECTOR 26, 35: SCREW CONVEYOR
34: CHUTE
38: PRESSURIZING DEVICE

FIG. 4  SECTIONAL VIEWS (a) AND (b) TAKEN ALONG LINES A AND B, RESPECTIVELY, OF FIG. 2

FIG. 5 PARTIAL ENLARGED SECTIONAL VIEW (1) OF FIG. 3

PARTIAL ENLARGED SECTIONAL VIEW (2) OF FIG. 3

43: COMPRESSION SLIDER
44: COMPRESSION CYLINDER
46: SLIDE BODY
47: CHANGE-OVER CYLINDER
48: MOLDING CHAMBER

FIG. 7
DETAILED STRUCTURAL DIAGRAM OF A COMPRESSION SLIDER AND A CYLINDER SLEEVE
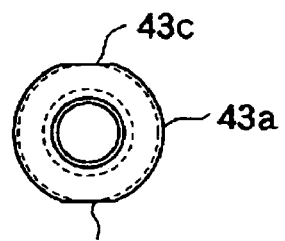
7(a)
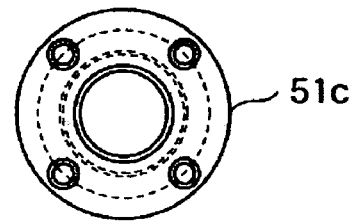
7(c)
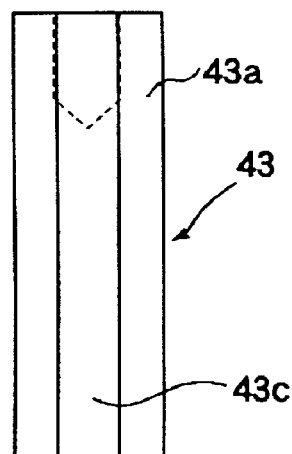
7(b)
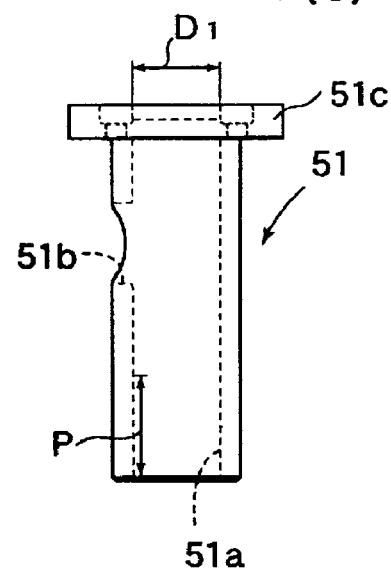
7(d)

FIG. 8
EXPLANATORY VIEW OF COMPRESSION MOLDING
AND A MOLDED ARTICLE EJECTING ACTION
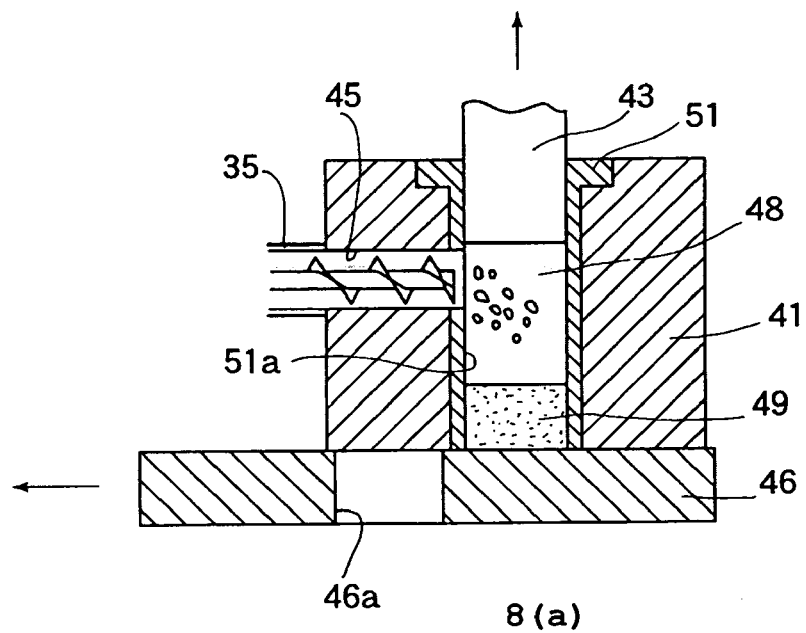
8(a)
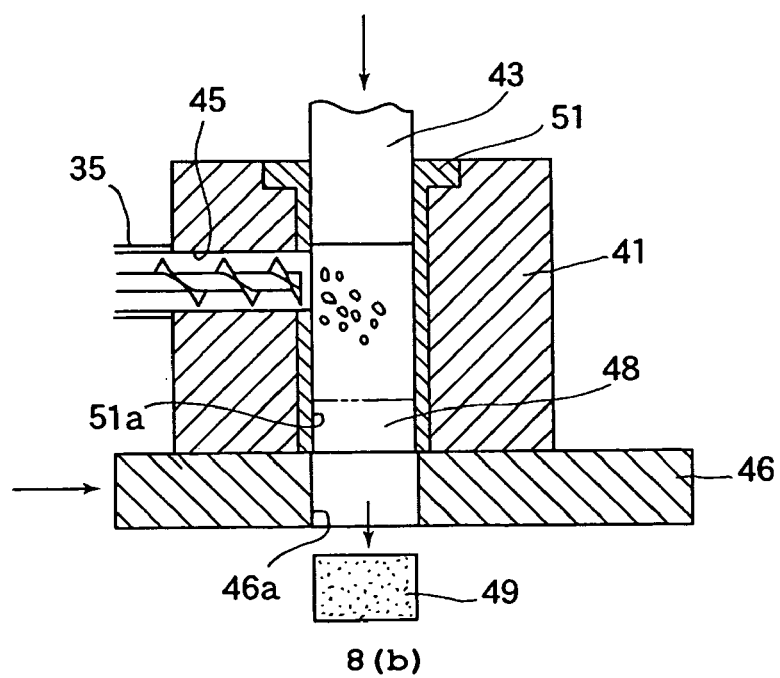
8(b)

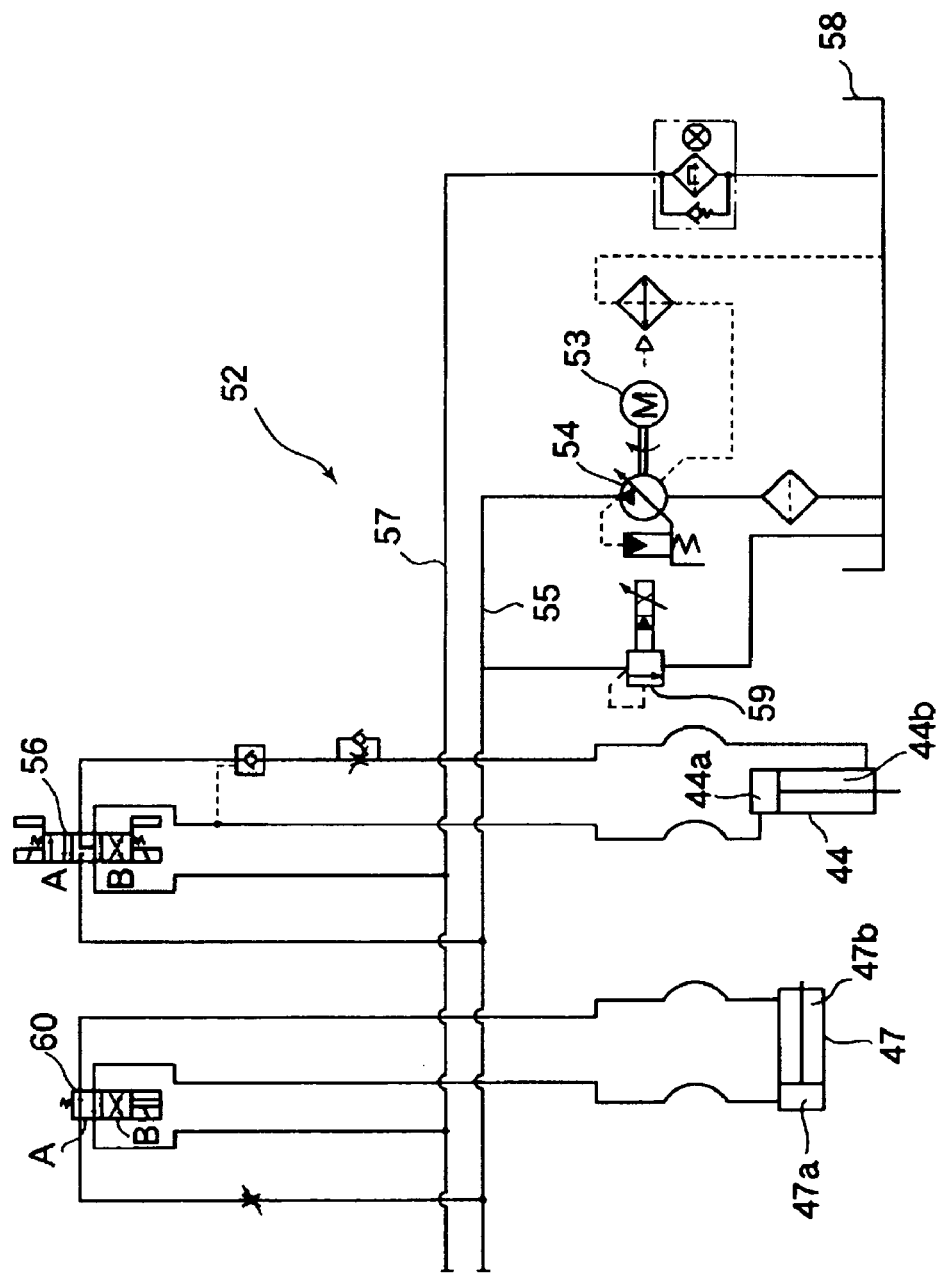
FIG. 9  HYDRAULIC CIRCUIT DIAGRAM OF A COMPRESSION CYLINDER AND A CHANGE-OVER CYLINDER

US 8,281,714 B2

FUME DISPOSAL PROCESS AND FUME DISPOSAL SYSTEM

This application is a U.S. National Phase Application under 35 USC 371 of International Application PCT/JP2006/316835 filed Aug. 28, 2006.

TECHNICAL FIELD

The present invention relates to a fume disposal process and fume disposal system that dispose fume generated during processing operation such as thermal cutting and welding performed on a metal material.

BACKGROUND ART

When thermally cutting a metal plate (hereinafter referred to as "workpiece") with plasma arc or laser light, molten metal and metal vapor blow off the cut grooves of the workpiece and coagulate, creating dust particles of several hundred microns to several sub-microns (the dust particles created when cutting the steel plate mainly contain iron oxide and such dust particles are hereinafter referred to as "fume"). Since this fume is lightweight, having a specific gravity of 0.5 g/cm$^3$ or less and floats in high-temperature gas, it pollutes the environment of the work site if it is left. Therefore, conventional thermal cutting machines of this type are equipped with a dust collector for collecting the fume suctioned from the inner space of the cutting table through a dust collection duct and, during thermal cutting operation, the dust collector is operated to thereby catch and collect the fume generated during the thermal cutting.

As such a dust collector, a dry-type dust collector is often used in which fine particles are removed from the fume by filtration with a bug filter or adsorbed by an electrode plate. In the dry-type dust collector, the fine particles separated and collected from the fume are once stored in a hopper. Then, they are automatically ejected from the dust collector by means of a rotary valve, screw conveyor or the like. Alternatively, the fine particles are manually scraped out with a shovel etc. and then packed in plastic bags, metal drums, pails etc. for disposal as industrial waste.

In a known technique related to the present invention, fine particles such as cotton dust collected by a dust filter etc. are compressed and solidified into a briquette shape by a pressing machine and then ejected from the system (see Patent Document 1).

Patent Document 1: Japanese Unexamined Patent Application Publication No. 5-230727

DISCLOSURE OF THE INVENTION

Problems that the Invention Intends to Solve

The above technique, however, has revealed that when manually disposing the fine particles which have been collected by the dust collector attached to the thermal cutting machine and stored in the hopper, powder dust flies and scatters, not only contaminating the work environment but also doing harm to the workers. Even in cases where the fine particles are automatically expelled from the system by means of a rotary valve, screw conveyor or the like and directly thrown into a metal drum etc. through the discharge spout, the replacement of metal drums inevitably involves handling by manpower and flying of powder dust unavoidably occurs at the time of the replacement.

When a soft steel plate is cut a multiplicity of times by a thermal cutting process, a large amount of fume is generated because the amount of cut of the workpiece is large. Plasma-arc cutting involves greater cut groove widths and higher cutting speeds, compared to laser cutting and therefore generates large amounts of fume (100 liters per day at the most). This pushes up the cost of disposing industrial waste and mars the merits of the thermal cutting technique and more particularly the plasma-arc cutting technique.

As noted earlier, the main component of the fume generated in cutting of a soft steel plate is iron oxide, and this iron oxide can be recycled as industrial raw material like scrap materials (e.g., scrap steel, broken parts, and small pieces of raw material removed in the process of producing an item) by remelting in an electric furnace. However, the fine particles collected by the dust collector are low in density, expensive to deliver and likely to fly and scatter so that they are difficult to reuse. If water is added or a fixation agent is mixed with the fine particles in order to prevent flying of them, they cannot be reused as iron oxide. For this reason, there has been high demand for development of a measure to dispose and reuse the fine particles collected by the dust collector.

Patent Document 1 cited herein as the related art is associated with a compression and solidification technique for fine particles such as cotton dusts collected in spinning factories and therefore cannot be simply applied to the disposal of the fume generated in thermal cutting operation etc. that is the subject matter of the invention.

The invention is directed to overcoming the foregoing problems and a primary object of the invention is therefore to provide a fume disposal process and fume disposal system that are capable of collecting fine particles from the fume generated in processing operations such as thermal cutting and welding performed on a metal material and capable of solidifying them, whereby an improvement in the work environment, a reduction in the disposal cost of the fine particles and facilitation of recycling can be achieved.

Means of Solving the Problems

Incidentally, the main component of the fume generated in thermal cutting etc. is not a simple coagulation of molten metal droplets but fine particles of iron oxide having a particle size of several hundred microns to several sub-microns, the fine particles being created from molten metal droplets which have been blown off and broken into smaller particles under the pressure of gas generated within the droplets as the oxidation reaction continues. The fine particles are not dense but hollow in structure and may include flake-shaped particles. Therefore, if the fine particles are pressurized under specified conditions without adding a fixation agent thereto, the particles are deformed and combined with one another in the process of volume reduction so that they are interlinked and solidified. The inventors have made the present invention based on the knowledge just described above.

In accomplishing the above objects, there has been provided, in accordance with the invention, a fume disposal process for disposing fume generated during processing of a metal material, the process comprising the steps of:

suctioning fume which has been generated;

separating and collecting fine particles from the fume suctioned;

conveying the separated, collected fine particles to a molding chamber; and pressurizing the fine particles, which has been conveyed to the molding chamber, to reduce the volume thereof (a first aspect of the invention).

There is provided a fume disposal system for disposing fume generated during processing of a metal material, the system comprising:

suction means for suctioning fume which has been generated;

collection means for separating and collecting fine particles from the fume suctioned by the suction means;

storage means for storing the fine particles separated and collected by the collection means;

conveying means for conveying the fine particles stored in the storage means to a molding chamber;

pressurization means for pressurizing the fine particles, which have been fed into the molding chamber, to reduce the volume thereof; and ejecting means for ejecting a molded article from the molding chamber, the molded article being produced by the pressurization with the pressurization means (a second aspect of the invention).

There is provided a fume disposal system for disposing fume generated during plasma cutting of a metal material, the system comprising:

suction means for suctioning fume which has been generated;

a fume introducing chamber which is connected to a cutting machine body through a suction duct and into which the fume suctioned by the suction means is introduced;

collection means for separating and collecting fine particles from the fume introduced into the fume introducing chamber;

storage means for storing the fine particles separated and collected by the collection means;

conveying means for conveying the fine particles stored in the storage means to a molding chamber;

pressurization means for pressurizing the fine particles, which have been fed into the molding chamber, to reduce the volume thereof; and ejecting means for ejecting a molded article from the molding chamber, the molded article being produced by the pressurization with the pressurization means (a third aspect of the invention).

In the second or third aspect of the invention, the pressurization means preferably includes a pressure varying apparatus for changing pressure to be imposed on the fine particles within the molding chamber (a fourth aspect of the invention).

In any of the second to fourth aspects of the invention, the pressurization means preferably includes a cylinder sleeve and a compression slider slidably fitted in the cylinder sleeve and clearance is provided between the inner circumferential surface of the cylinder sleeve and the outer circumferential surface of the compression slider so as to allow passage of the fine particles to be pressurized (a fifth aspect of the invention).

In the second or third aspect of the invention, the conveying means preferably has a hermetically closed structure (a sixth aspect of the invention).

In the third aspect of the invention, the suction duct is preferably provided with a prefilter interposed therein, for adjusting the particle size of the fume suctioned (a seventh aspect of the invention).

Effects of the Invention

According to the first and second aspects of the invention, the fine particles separatively collected from the fume generated during processing of a metal material are pressurized and solidified into pellet form in the molding chamber and ejected therefrom, so that they do not fly nor scatter like powder dust, which leads to not only facilitation of disposing operation but also an improvement in the work environment. In addition, since the volume of the fine particles is reduced to about $\frac{1}{5}$ to $\frac{1}{20}$, preferably to $\frac{1}{5}$ to $\frac{1}{15}$ and more preferably to $\frac{1}{7}$ to $\frac{1}{11}$, the disposal cost can be largely cut. Further, the volume-reduced, solidified pellets containing iron oxide as a main component are not industrial waste but can be reused as the raw material of steel by remelting, similarly to scrap materials. This not only saves the cost of disposing industrial waste but also creates the utility value of the fine particles as industrial raw material, so that further cost saving becomes possible.

According to the third aspect of the invention, the disposal technique such as disclosed in the first aspect can be applied to a plasma cutting machine, thereby most effectively exerting the above-described effects.

According to the fourth aspect of the invention, the pressurization and volume reduction can be properly controlled according to the condition of the fine particles. More concretely, if the fine particles are conveyed in large amounts, the pressure to be applied to the fine particles can be made high whereas if the volume of the fine particles is repetitively reduced in the molding chamber, the pressure to be applied can be made low.

By use of the arrangement described in the fifth aspect of the invention, the fine particles can be allowed to positively penetrate, moving onto the sliding contact surfaces, i.e., the inner circumferential surface of the cylinder sleeve and the outer circumferential surface of the compression slider, and the penetrating fine particles function as a lubricant for the sliding contact surfaces. As a result, the cylinder sleeve and the compression slider can be prevented from being worn away.

Pressure fluctuations occur such that the inner space of the storage means comes into a negative pressure condition when the fine particles are separatively collected and into a positive pressure condition when the collection means is backwashed. Use of the conveying means of hermetically closed structure described in the sixth aspect of the invention prevents jetting-out and flying of the fine particles being conveyed by the conveying means without fail regardless of the pressure fluctuation described just above.

By use of the arrangement described in the seventh aspect of the invention, foreign material can be removed from the fume by the prefilter and the particle size of the passing fume can be regulated before the fine particles are selectively collected from the fume. In addition, fire spark can be shut out. As a result, occurrence of troubles due to a jam in the conveying means and the molding chamber can be prevented.

BRIEF DESCRIPTION OF THE DRAWINGS

FIG. 7(a)-7(d) show detailed structural diagrams of a compression slider and a cylinder sleeve.

FIG. 8(a) and 8(b) are explanatory views of compression molding and a molded product ejecting action.

FIG. 9 is a hydraulic circuit diagram of a compression cylinder and a change-over cylinder.

EXPLANATION OF REFERENCE NUMERALS

Figure 1:
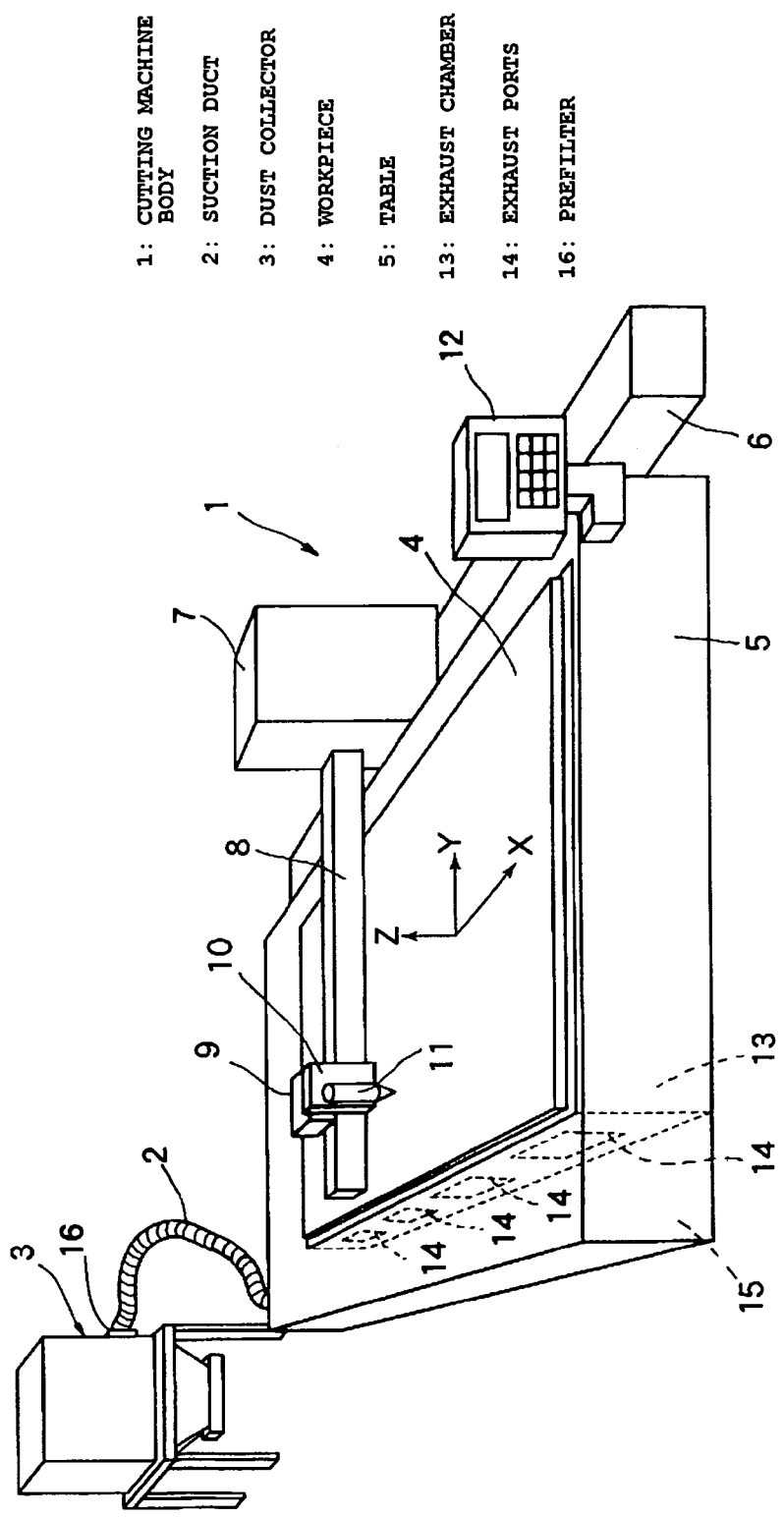
FIG. 1 is an overall perspective view of a plasma cutting machine according to an embodiment of the invention.

1: cutting machine body
2: suction duct
3: dust collector
4: workpiece
5: table
11: torch
13: exhaust chambers
14: exhaust ports
15: suction chamber
16: prefilter
21: dust collector body
22: hopper
23: exhaust chamber
24: bug filter
25: fume introducing chamber
26: screw conveyor
34: chute
35: screw conveyor
38: pressurizing device
41: slide tubular body
43: compression slider
44: compression cylinder
46: slide body
47: change-over cylinder
48: molding chamber
49: molded article
51: cylinder sleeve

BEST MODE FOR CARRYING OUT THE INVENTION

Referring now to the accompanying drawings, a fume disposal process and fume disposal system will be described according to an embodiment of the invention.

FIG. 1 shows an overall perspective view of a plasma cutting machine according to an embodiment.

In this embodiment, the plasma cutting machine is composed of a cutting machine body 1 and a dust collector 3 connected to the cutting machine body 1 through a suction duct 2.

The cutting machine body 1 has a table 5 for supporting a workpiece 4; a supply car 7 capable of travelling on an X-axis track 6 that is laid on a floor so as to extend along the table 5; a carriage 9 that is movable along a Y-axis track 8 fixed to the supply car 7; a movable platform 10 mounted on the carriage 9 so as to be moveable in a Z-axis direction; and a torch 11 mounted on the movable platform 10 for jetting a plasma arc. Additionally, there are provided servo motors (not shown) for driving the supply car 7, the carriage 9 and the movable platform 10 respectively and a control unit 12 for outputting an NC control command to each of the servo motors in accordance with a specified NC program. The control unit 12 controls the position and speed of the torch 11 with respect to each axis, thereby cutting the workpiece 4 into a predetermined shape.

The inner space of the table 5 is partitioned into a plurality of small exhaust chambers 13 by a plurality of partition boards (not shown) that are arranged in parallel with a side of the table 5 (i.e., a short side of the table 5 in this embodiment). An exhaust port 14 is provided on the side of each exhaust chamber 13, for suctioning fume generated during processing of the workpiece 4 from the exhaust chambers 13. Provided at a position opposed to each exhaust port 14 (a position at the right of each exhaust port 14 in FIG. 1) is an air outlet (not shown) for sending push air to its associated exhaust port 14.

In the inner space of the table 5, a suction chamber 15 is provided at a position opposite to the exhaust chambers 13 with the exhaust ports 14 disposed therebetween, for joining the flows of fume suctioned through the exhaust ports 14 together. An end of the suction chamber 15 is communicated with one end of the suction duct 2, and the other end of the suction duct 2 is, in return, communicated with a fume introducing chamber 25 (see FIG. 2) of the dust collector 3 described later. The joint of the suction duct 2 and the fume introducing chamber 25, that is, the fume inlet opening of the fume introducing chamber 25 is provided with a prefilter 16 for adjusting the diameters of the particles of the fume to a specified size before the fume is suctioned into the dust collector 3. The prefilter 16 removes foreign material existing in the fume. The prefilter 16 is blind-like in shape, being constituted by a number of iron plates arranged at a specified angle to the flow of air. The fume strikes against the iron plates of the prefilter 16 and loses its kinetic energy so that it undergoes fall separation. Thus, large fume particles are removed and the particle size of the fume to be allowed to pass through the prefilter 16 is adjusted. This prefilter 16 also functions to shut off fire spark existing in the passing fume. In this way, the fume passes through the prefilter 16 when collecting the fine particles of the fume, so that large-sized foreign material (e.g., fire spark and spatter), which could be a cause of the trouble of a jam in screw conveyors 26, 35 described later and the molding chamber 48, can be removed.

Figure 2:
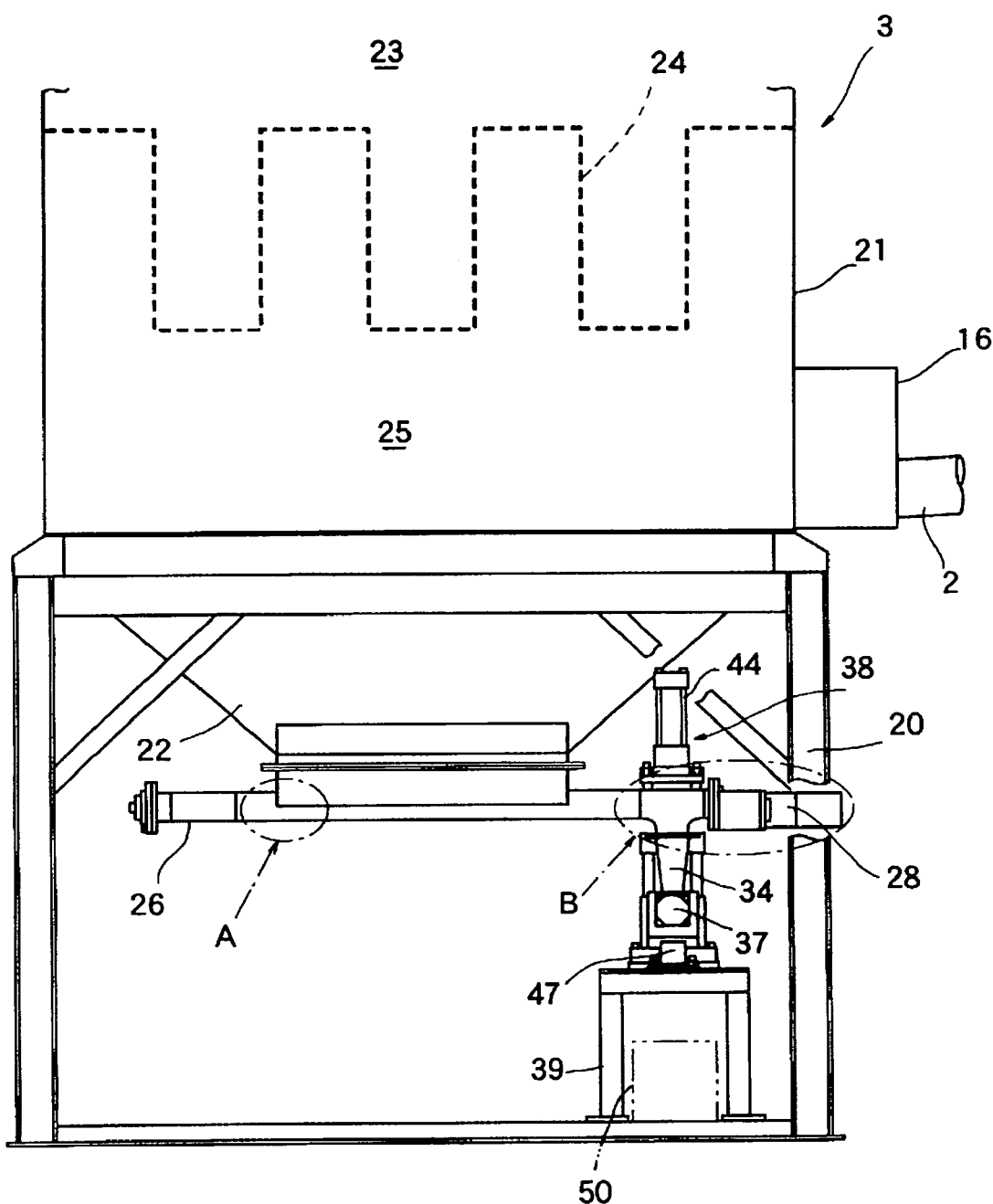
FIG. 2 is a partial front view of a dust collector according to the embodiment.
Figure 3:
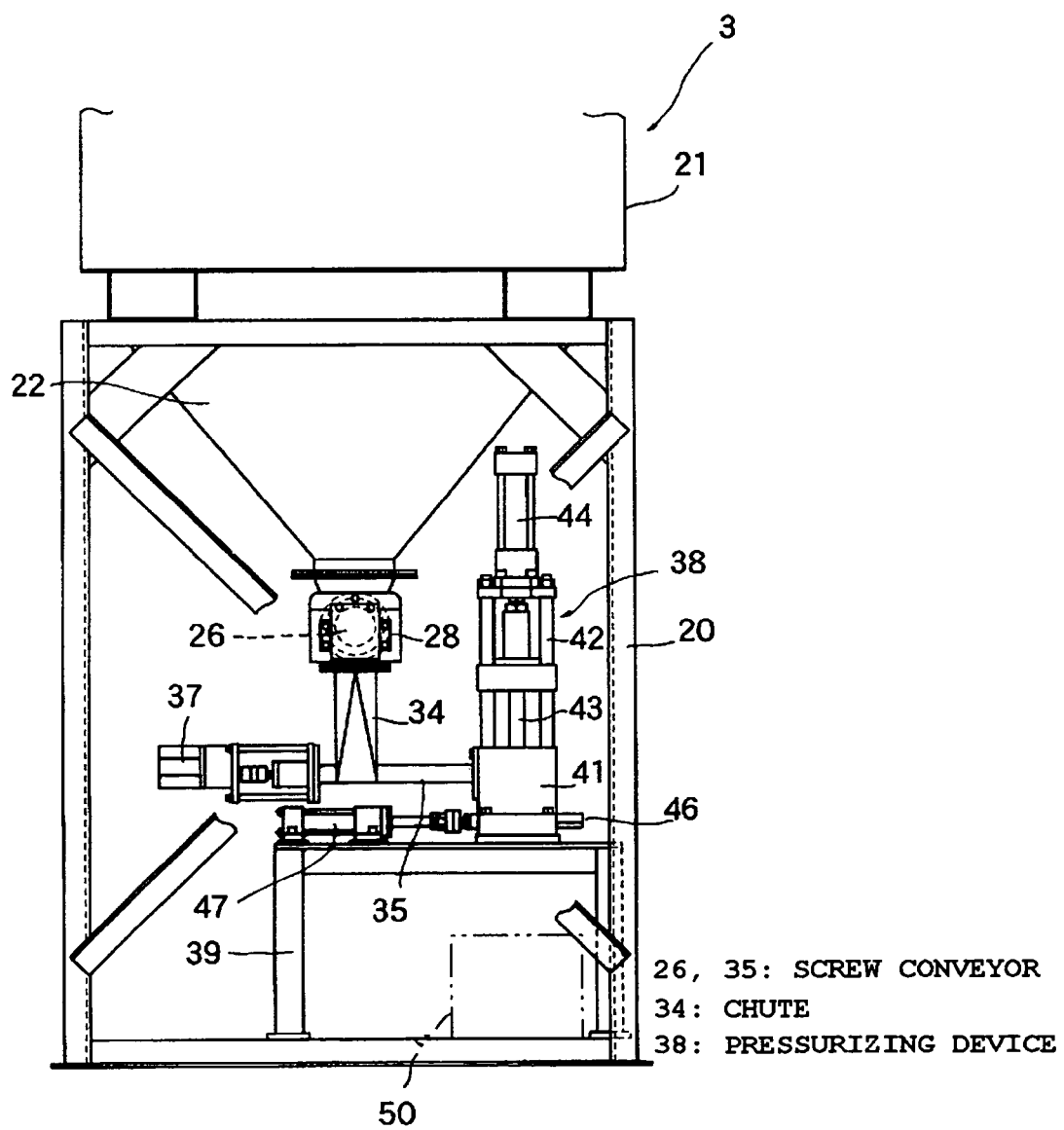
FIG. 3 is a partial side view of the dust collector according to the embodiment.
Figure 4:
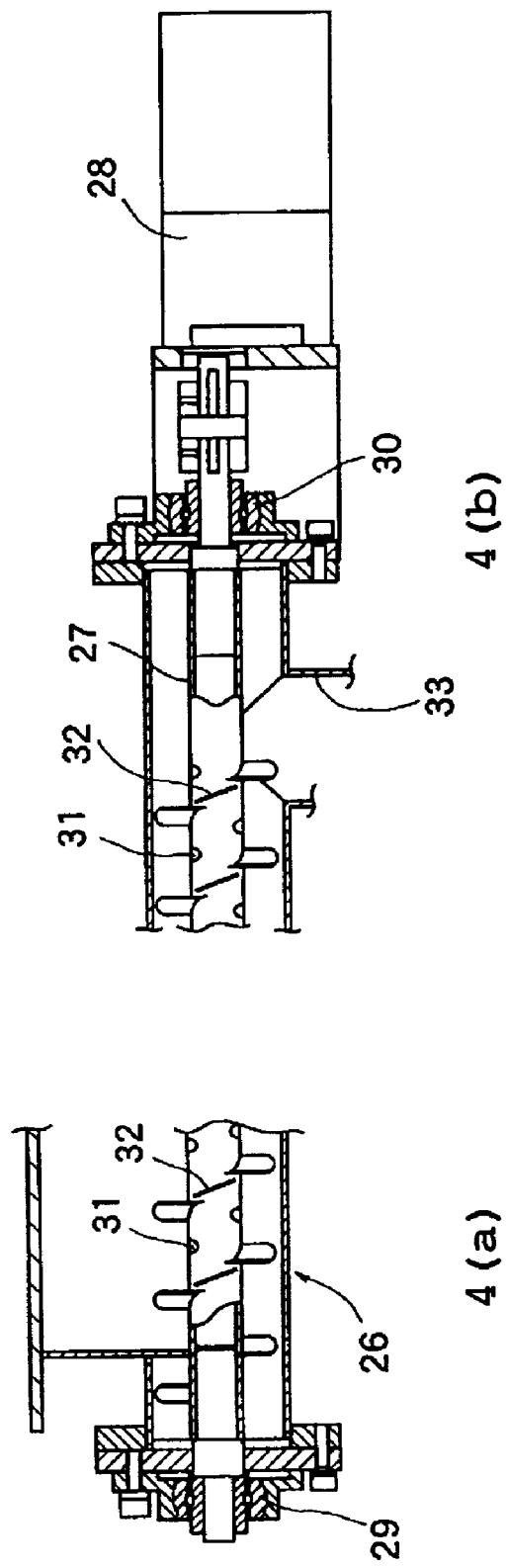
FIGS. 4(a) and 4(b) are sectional views taken along lines A and B, respectively, of FIG. 2.
Figure 5:
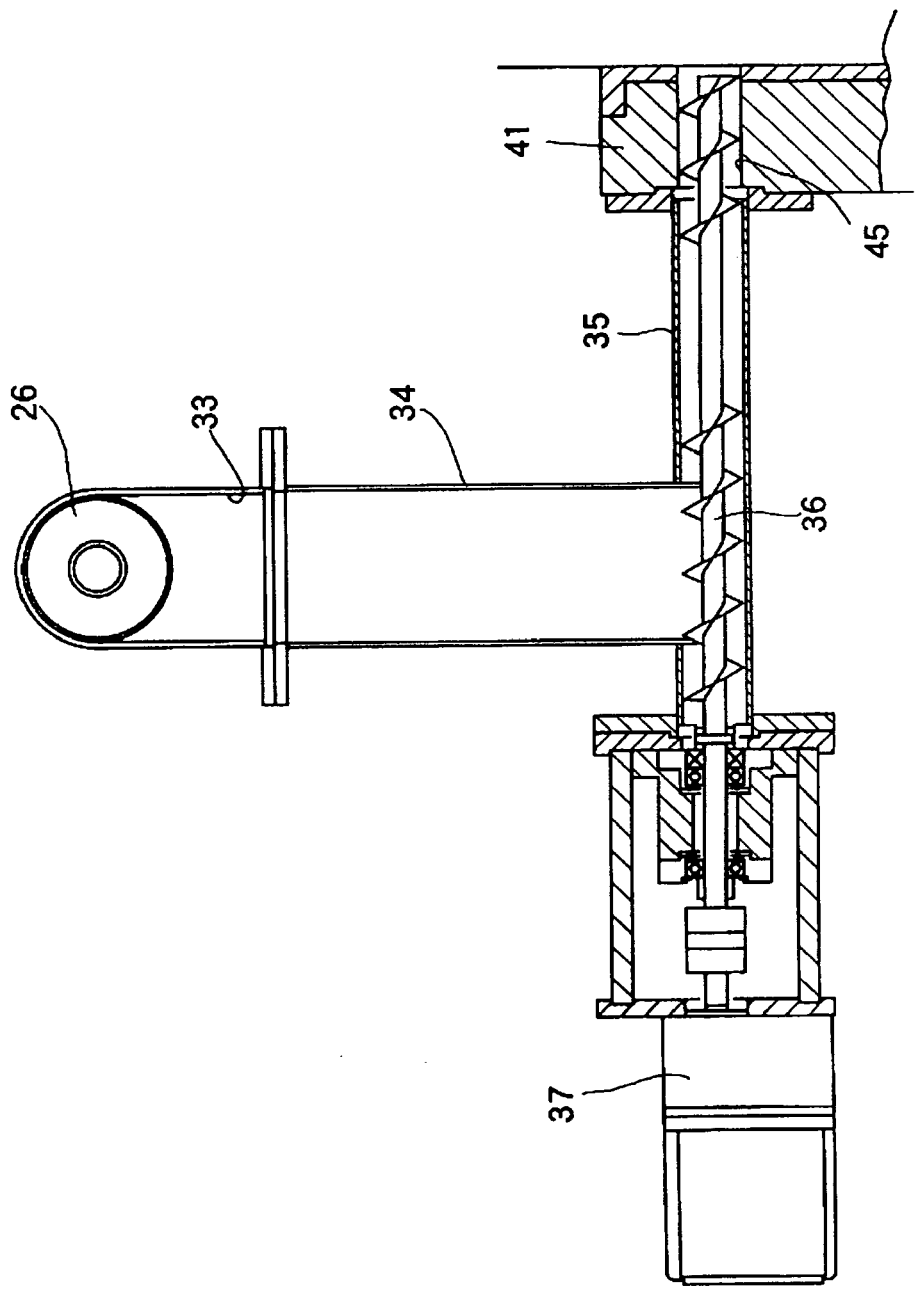
FIG. 5 is a partial enlarged sectional view (1) of FIG. 3.
Figure 6:
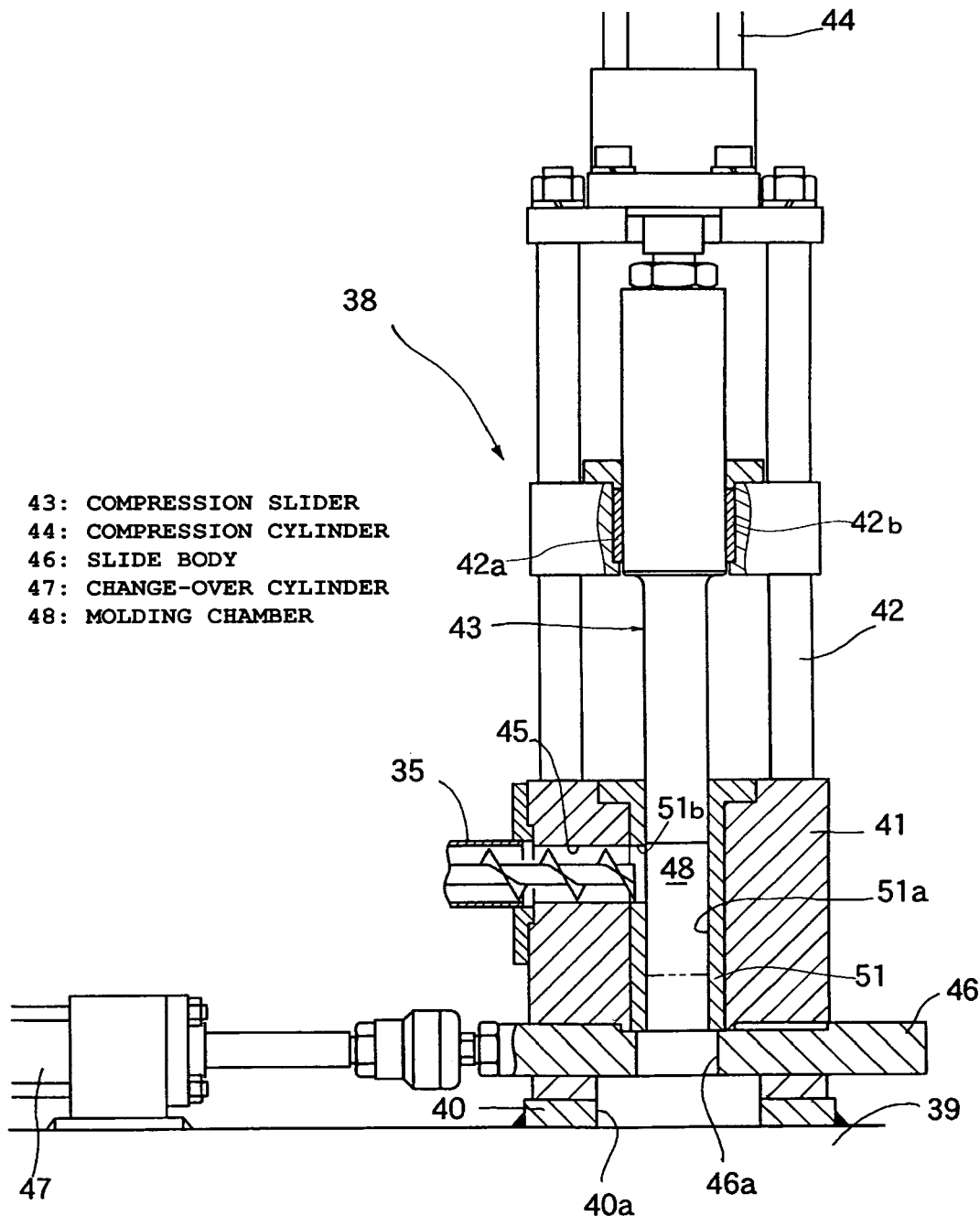
FIG. 6 is a partial enlarged sectional view (2) of FIG. 3.

Next, the structure of the dust collector 3 will be explained in detail. FIGS. 2 and 3 show a partial front view and partial side view, respectively, of the dust collector of this embodiment. FIGS. 4(a) and 4(b) show sectional views taken along lines A and B, respectively, of FIG. 2. FIGS. 5 and 6 show a partial enlarged sectional view (1) and partial enlarged sectional view (2), respectively, of FIG. 3.

The dust collector 3 of this embodiment includes a mount 20 assembled by angle members etc.; a dust collector body 21 placed in a position above the mount 20; and a hopper (storage means) 22 placed under the dust collector body 21. The dust collector body 21 includes an exhaust chamber 23 equipped with an intake fan (not shown) provided at the upper part thereof, for discharging cleaned air and the fume introducing chamber 25 that is opposed to the exhaust chamber 23 with a bug filter 24 disposed therebetween. The suction duct 2 is connected to the fume introducing chamber 25 through the prefilter 16 such that the fume is introduced into the fume introducing chamber 25. In this way, the fume within the suction chamber 15 of the cutting machine body 1 is drawn into the fume introducing chamber 25 through the suction duct 2 together with air, by activating the intake fan (suctioning means) of the exhaust chamber 23. Then, fine particles are separated and collected from the fume by the bug filter 24 while cleaned air is discharged to the atmosphere by way of the exhaust chamber 23.

The hopper 22 is placed under the fume introducing chamber 25 and the fine particles separated and collected from the fume by the bug filter 24 are kept in the hopper 22. Provided on the lower wall surface of the hopper 22 are a plurality of air exhaust nozzles (not shown) through which air is blown to the fine particles stored in the hopper 22, thereby expediting the fluidization of the fine particles.

Provided under the hopper 22 is the screw conveyor 26 that extends in a horizontal direction, for discharging the fine particles stored in the hopper 22. As illustrated in FIG. 4, the screw conveyor 26 has a hollow screw shaft 27. The screw shaft 27 is coupled to the output shaft of a driving motor 28 and supported at both ends thereof by bearings 29, 30 so as to be rotated by activation of the driving motor 28. In the screw shaft 27, air exhaust nozzles 31 are aligned in an axial direction at specified intervals. Air is jetted through the air exhaust nozzles 31 to speed up the fluidization of the fine particles and prevent the bridge phenomenon. In addition, the surface of the screw shaft 27 is provided with a plurality of notches 32 to prevent the solidification of the fine particles during conveyance so that the amount of fine particles discharged from the screw conveyor 26 is kept constant. The provision of the screw conveyor 26 under the hopper 22 as the conveying means like this embodiment has the effect of restraining the height of the hopper 22 more effectively than cases where a chute is used and therefore contributes to miniaturization of the system and, in consequence, reduces the space taken up by the system.

A vertically directed chute 34 is connected to the outlet 33 of the screw conveyor 26. Provided under the outlet 33 of the chute 34 is the screw conveyor 35 that is perpendicular to the screw conveyor 26 and horizontally directed for pressure-feeding the fine particles. As illustrated in FIG. 5, the screw conveyor 35 is formed with a screw shaft 36 being coupled to the output shaft of a driving motor 37 such that the screw conveyor 35 is rotated by activation of the driving motor 37. During the rotation, the screw conveyor 35 forcibly delivers the fine particles supplied from the chute 34 in a forward direction. The use of the screw conveyor 35 as a conveying means for introducing the fine particles into a pressurizing device 38 (described later) like this embodiment has the effect of reliably delivering the fine particles into the pressurizing device 38 a certain amount at a time.

The conveying means composed of the screw conveyor 26, the chute 34 and the screw conveyor 35, that is, the conveying means extending from the hopper 22 to a molding chamber 48 (described later) is hermetically closed. The reasons for this are as follows: (1) the fine particles separated and collected by the bug filter 24 are likely to fly; (2) the hopper 22 comes into a negative pressure condition during separative collection of the fine particles and into a positive pressure condition during backwashing of the bug filter 24, and if the conveying means is partially opened to the external air, the fine particles will jet out from the opening in some cases owing to the pressure fluctuation. While the screw conveyors 26, 35 are horizontally arranged in the embodiment, they may be disposed so as to incline downwardly. Thereby, the fine particles are not pressurized by their own weight when they are being conveyed so that occurrence of a jam can be prevented during delivery.

As illustrated in FIG. 6, the pressurizing device 38 is connected to the outlet of the screw conveyor 35. The pressurizing device 38 is placed on a small mount 39 located under the mount 20. The pressurizing device 38 includes a slide tubular body 41 that stands upright on a base 40; a tubular cylinder sleeve 51 having a shaped hole 51a and fitted in the receiving hole of the slide tubular body 41; a compression slider 43 supported by a press frame 42 so as to be freely vertically movable along the inner circumferential surface of the cylinder sleeve 51; and a compression cylinder 44 for moving the compression slider 43 in a vertical direction by hydraulic driving. A feed path 45 for the fine particles is formed in a side part of the slide tubular body 41, and a communication hole 51b communicated with the feed path 45 is formed in the cylinder sleeve 51. The feed path 45 is communicated with the outlet of the screw conveyor 35.

Inserted in the lower part of the slide tubular body 41 is a slide body 46 that is slidable in a direction perpendicular to the moving direction of the compression slider 43. The slide body 46 is designed to be reciprocated in a lateral direction in FIG. 6 by the movement of the change-over cylinder 47. The slide body 46 is provided with an outlet hole 46a slightly larger than the shaped hole 51a of the cylinder sleeve 51. When the outlet hole 46a is aligned so as to be communicated with the shaped hole 51a (the condition shown in FIG. 6), a molded article 49 (see FIG. 8) falls down after passing through the outlet hole 46a and an outlet hole 40a defined in the base 40. When the slide body 46 moves to a position where the slide body 46 closes the shaped hole 51a of the cylinder sleeve 51, the inner side face of the slide tubular body 41, the top face of the slide body 46 and the bottom face of the compression slider 43 define the molding chamber 48. It should be noted that the slide tubular body 41, cylinder sleeve 51, compression slider 43 and slide body 46 of this embodiment correspond to the pressurization means of the invention.

Next, the detailed structure of the compression slider 43 and the cylinder sleeve 51 will be described with reference to FIG. 7. FIGS. 7(a), 7(b) are a top view and front view, respectively, of the compression slider 43. FIGS. 7(c), 7(d) are a top view and front view, respectively, of the cylinder sleeve 51.

The compression slider 43 has a large-diameter base portion 43a and a small-diameter piston portion 43b attached to the leading end of the base portion 43a. The compression slider 43 is configured such that two face-width portions 43c formed in the base portion 43a slide along sliding members 42a, 42b (see FIG. 6), respectively, provided on the side of the press frame 42. The piston portion 43b is induction-hardened. The cylinder sleeve 51 has a flange portion 51c at the upper end thereof and the cylindrical shaped hole 51a. The cylinder sleeve 51 also has a communication hole 51b at a side thereof which hole is communicated with the shaped hole 51a. With this arrangement, the piston portion 43b of the compression slider 43 is fitted in the shaped hole 51a of the cylinder sleeve 51 and the piston portion 43b slides along the shaped hole 51a, whereby the fine particles in the molding chamber 48 are pressurized and reduced in volume.

The inner diameter $D_1$ of the shaped hole 51a is about 0.2 to 0.3 mm larger than the outer diameter $D_2$ of the piston portion 43b. In other words, a clearance having a size of about 0.1 to 0.15 mm is provided between the inner circumferential surface of the cylinder sleeve 51 and the outer circumferential surface of the piston portion 43b to allow passage of the fine particles to be pressurized. The leading end P (see FIG. 7(d)) of the shaped hole 51a of the cylinder sleeve 51 is tapered so that the diameter in this area is slightly increased, thereby preventing clogging of the fine particles when they are discharged.

The clearance is provided between the inner circumferential surface of the cylinder sleeve 51 and the outer circumferential surface of the piston portion 43b for the following reason. It has been found by a test conducted by the inventors that the fine particles allowed to actively penetrate into the space between the sliding surfaces of the cylinder sleeve 51 and the piston portion 43b do not act as a hindrance but act as a solid lubricant. This is attributable to the fact that the fine particles are spherical in shape and function like the steel balls of a bearing. According to the test, when a clearance having a diameter of about 0.15 mm is provided between the cylinder sleeve 51 and the piston portion 43b, seizure does not occur on the sliding surfaces and neither the cylinder sleeve 51 nor the piston portion 43b are worn away. However, the provision of such a clearance causes leak of the fine particles. In order to prevent contamination of the environment with such leaking fine particles, the outer circumference of the slide tubular body 41 is covered while the fine particles leaking from the slide tubular body 41 is put back to the hopper 22 in this embodiment, although not shown in the drawings. In this embodiment, since the fine particles of the fume are adjusted so as to have a specified particle diameter by the prefilter 16 before the fume is drawn into the dust collector 3, the fine particles can more reliably function as a solid lubricant in the sliding surfaces between the cylinder sleeve 51 and the piston portion 43b and, in consequence, the reliability and durability of the pressurization section can be improved.

Next, the fume disposal process performed by use of the plasma cutting machine having the above-described structure will be described.

After the workpiece 4 is placed on the table 5 of the cutting machine body 1 and cutting of the workpiece 4 is started, the intake fan of the dust collector 3 is activated while push air being ejected from the air outlets provided under the table 5. Thereby, the fume generated during processing of the workpiece 4 is introduced into the dust collector 3 through the suction duct 2 together with air which is drawn from the exhaust chambers 13 through the exhaust ports 14. At that time, the fume being delivered by the suction duct 2 is adjusted so as to have a specified particle diameter and foreign material is removed from the fume, while the fume is passing through the prefilter 16 interposed in the suction duct 2.

In this way, the fine particles of the fume drawn into the fume introducing chamber 25 of the dust collector 3 are separated and collected by the bug filter 24 and the cleaned air is released to the atmosphere by way of the exhaust chamber 23. The fine particles collected by the bug filter 24 are once stored in the hopper 22 under the fume introducing chamber 25 and then properly fluidized by air jetted from the air exhaust nozzles provided in the hopper 22.

After a desired amount of fine particles is stored in the hopper 22, the screw conveyor 26 under the hopper 22 is driven by the driving motor 28. Subsequently, the fine particles in the hopper 22 fall onto the screw conveyor 26 in a continuous manner and are then conveyed by the screw conveyor 26 to its outlet 33. During the conveyance of the fine particles, air is ejected from the air exhaust nozzles 31 formed in the screw shaft 27, thereby expediting the fluidization of the fine particles, whereas the notches 32 formed on the surface of the screw shaft 27 prevent the solidification of the fine particles during the conveyance.

Thereafter, the fine particles fall from the outlet 33 through the chute 34 onto the screw conveyor 35 located under the chute 34 and are then pneumatically moved forward by the intermittent motion of the screw conveyor 35 driven by the driving motor 37. The fine particles are then fed into the molding chamber 48 from the feel path 45 formed in the slide tubular body 41 of the pressurizing device 38. When the fine particles are fed into the molding chamber 48, the slide body 46 is located in a position where it closes the shaped hole 51a, as illustrated in FIG. 8(a).

After the amount of fine particles fed to the molding chamber 48 has reached a specified value, the compression cylinder 44 is operated to move the compression slider 43 downward, so that the fine particles within the molding chamber 48 are compressed, reduced in volume and solidified by the piston portion 43b. The intermittent motion of the screw conveyor 35 and the upward and downward movement of the compression slider 43 are controlled in an interlinked manner such that when the fine particles are fed to the molding chamber 48, the compression slider 43 stops at an ascent position and when the supply of the fine particles is stopped, the compression slider 43 descends to pressurize the fine particles within the molding chamber 48. In addition, the two screw conveyors 26, 35 are also driven in an interlinked manner.

The feeding of the fine particles by the screw conveyor 35 and the upward and downward movement of the compression slider 43 are thus repeated several times so that the fine particles fed to the molding chamber 48 are pressurized and solidified into the molded article 49. After a limit switch (not shown) detects the position of the compression cylinder 44, thereby detecting that the size (height) of the molded article 49 has reached a specified value, the screw conveyor 35 and the compression slider 43 are both stopped while putting the change-over cylinder 47 into operation, so that the slide body 46 moves forward as illustrated in FIG. 8(b) to such a position that the outlet hole 46a of the slide body 46 is communicated with the shaped hole 51a of the cylinder sleeve 51. At this position, the compression slider 43 is moved downward, thereby forcing the molded article 49 down. Since the small mount 39 is provided with a collection box 50 (see FIGS. 2 and 3), the fallen molded article 49 is received in the collection box 50. It should be noted that the compression slider 43 and the outlet hole 46a of the slide body 46 of this embodiment correspond to the ejecting means of the invention.

The compression cylinder 44 and the change-over cylinder 47 are operated by a hydraulic circuit 52 as shown in FIG. 9. In this hydraulic circuit 52, the pressure oil from a variable displacement hydraulic pump 54 driven by an electric motor 53 is reduced in pressure by a proportional solenoid relief valve 59 and supplied from a first oil path 55 to either a head side chamber 44a or rod side chamber 44b of the compression cylinder 44 by way of a first directional control valve 56. The return oil from the rod side chamber 44b or head side chamber 44a of the compression cylinder 44 goes from a second oil path 57 back to a tank 58 by way of the first directional control valve 56. In addition, the pressure oil from the variable displacement hydraulic pump 54 is reduced in pressure by the proportional solenoid relief valve 59 and supplied from the first oil path 55 to either a head side chamber 47a or rod side chamber 47b of the change-over cylinder 47 by way of a second directional control valve 60. The return oil from the rod side chamber 47b or head side chamber 47a of the change-over cylinder 47 goes from the second oil path 57 back to the tank 58 by way of the second directional control valve 60. Accordingly, when the first directional control valve 56 is in Position A, the compression slider 43 moves in a contracting direction (upward) and when the first directional control valve 56 is in Position B, the compression slider 43 moves in an extending direction (downward). When the second directional control valve 60 is in Position A, the change-over cylinder 47 moves in a contracting direction (leftward when viewed in FIG. 6) and when the second directional control valve 60 is in Position B, the change-over cylinder 47 moves in an extending direction (rightward when viewed in FIG. 6).

The set pressure of the proportional solenoid relief valve 59 is changeable and pressure oil having this set pressure, i.e., the pressure set by the proportional solenoid relief valve 59 is supplied to the compression cylinder 44 (and to the change-over cylinder 47). In this case, when the change-over cylinder 47 is in a contraction position, that is, when the slide body 46 is in such a position that it closes the shaped hole 51a as illustrated in FIG. 8(a), the set pressure of the proportional solenoid relief valve 59 is applied to the first oil path 55 and therefore, the pressure imposed on the fine particles within the molding chamber 48 by the compression cylinder 44 can be changed by altering the set pressure of the proportional solenoid relief valve 59. The proportional solenoid relief valve 59 of this embodiment corresponds to the pressure varying apparatus of the invention.

If the fine particles are delivered in large amounts, the set pressure by the proportional solenoid relief valve 59 is high and if the fine particles are repeatedly reduced in volume within the molding chamber 48, it is set low for fear that the previously produced molded product of fine particles will be broken up. And, the set pressure is high when the molded article 49 produced by volume reduction and solidification within the molding chamber 48 is forced down. Thus, the set pressure of the proportional solenoid relief valve 59, that is, the pressure to be imposed on the fine particles within the molding chamber 48 can be altered in accordance with the amount and condition of the fine particles within the molding chamber 48. As a result, more adequate pressurization and volume reduction of the fine particles are enabled.

It is preferable to set the compressing force of the compression slider 43 in the molding chamber 48 to 100 kg/cm² or more. If this compressing force is less than 100 kg/cm², the solidification of the fine particles becomes difficult.

According to this embodiment, the volume reduction ratio (apparent density) adopted in the step of pressurizing and solidifying the fine particles may be ⅕ to ¹⁄₂₀. In addition, the volume reduction and solidification can be carried out without use of a fixation agent. This has not only the effect of achieving significant disposal cost reduction but also the following effect. That is, the pellets, that mainly contains the volume-reduced, solidified iron oxide, can be reused as the raw material of steel by remelting, like scrap material so that the value of the pellets as industrial material arises (i.e., profits can be made by selling the pellets to a recycling manufacture). Of course, the work environment will not be damaged by flying fine particles and therefore the workers do not need to endure hard working conditions.

Since the foregoing embodiment is designed such that the fine particles carried out from the lower part of the hopper 22 by the screw conveyor 26 is fed into the molding chamber 48 by the screw conveyor 35 that serves as the conveying means, the amount of fine particles delivered does not vary and therefore a constant amount of fine particles can be reliably fed into the molding chamber 48. Although the screw conveyor 35 has been described as the conveying means in the foregoing embodiment, the conveying means is not necessarily limited to this. Other examples of the conveying means include cylinder pistons, free fall methods and the like.

Although the fume is conveyed by the screw conveyor while applying pressure to it (i.e., pneumatic transportation) in the foregoing embodiment, it may be conveyed simply by a belt conveyor. It is also possible to replace the automatic conveying means such as the screw conveyors 26, 35 with semi-automatic conveying means that involve handling by manpower.

Although the hydraulically-driven compression cylinder 44 is used as the pressurization means for reducing the volume of the fine particles within the molding chamber 48 through pressurization, other means such as pneumatic systems, screw drives and motors may be used as the pressurization means. Use of a link mechanism or eccentric mechanism has a disadvantage that the level of pressurizing force is difficult to change.

Although the invention has been described in the context of the separation/collection of the fine particles by use of a bug filter in the foregoing embodiment, an electric dust collector may be used as the separation/collection means.

Although the fume disposal process of the invention has been described in terms of a plasma cutting machine in the foregoing embodiment, it is apparent that the invention is applicable not only to thermal cutting machines such as laser processing machines but also to disposal of fume generated in welding operation.

The invention claimed is:

1. A fume disposal system for disposing fume generated during plasma cutting of a metal material, the system comprising:
   suction means for suctioning fume which has been generated by a cutting machine body;
   a fume introducing chamber which is connected to the cutting machine body through a suction duct and into which the fume suctioned by the suction means is introduced;
   collection means for separating and collecting fine particles from the fume introduced into the fume introducing chamber, wherein said collection means includes a dry-type dust collector;
   storage means for storing the fine particles separated and collected by the collection means;
   conveying means for conveying the fine particles stored in the storage means to a molding chamber, wherein said conveying means has a hermetically closed structure;
   pressurization means for pressurizing the fine particles, which have been fed into the molding chamber, to reduce the volume thereof,
   wherein said molding chamber is defined by a tubular cylinder sleeve having a shaped hole, a compression slider that is slidable along an inner circumferential surface of the cylinder sleeve, and a slide body that slidably moves from a position in which a first end of the shaped hole is open to a position in which the first end of the shaped hole is closed,
   wherein the cylinder sleeve includes a communication hole formed on the inner circumferential surface and communicating with the shaped hole and through which the fine particles conveyed by the conveying means are fed to the molding chamber,
   wherein when the first end of the shaped hole is closed by the slide body and the compression slider is moved toward the first end of the shaped hole from a second, opposite end of the shaped hole, the communication hole is closed by the compression slider and the fine particles in the molding chamber are pressurized and solidified into pellet form without addition of a fixation agent,
   wherein the compression slider is arranged such that when the compression slider is moved toward the first end of the shaped hole, a portion of an outer circumferential surface of the compression slider is disposed to face and close the communication hole,
   wherein the compression slider has substantially a same diameter throughout a length thereof which is arranged to be disposed within the shaped hole of the cylinder sleeve when the compression slider is moved toward the first end of shaped hole,
   wherein the system further comprises ejecting means for ejecting a molded article from the molding chamber, the molded article being produced by the pressurization with the pressurization means,
   wherein a clearance having a size of about 0.1-0.15 mm is provided between the inner circumferential surface of the cylinder sleeve and the outer circumferential surface of the compression slider so as to allow passage of the fine particles, and
   wherein the outer circumference of the cylinder sleeve is covered such that the fine particles leaking from the clearance are put back into the storage means.

2. The fume disposal system according to claim 1, wherein the pressurization means includes a pressure varying apparatus for changing pressure to be imposed on the fine particles within the molding chamber.

3. The fume disposal system according to claim 1, wherein the suction duct is provided with a prefilter interposed therein for adjusting a particle diameter of the suctioned fume.

* * * * *